(No Model.) 3 Sheets—Sheet 3.
R. BERG.
FEED WATER REGULATOR.
No. 589,113. Patented Aug. 31, 1897.
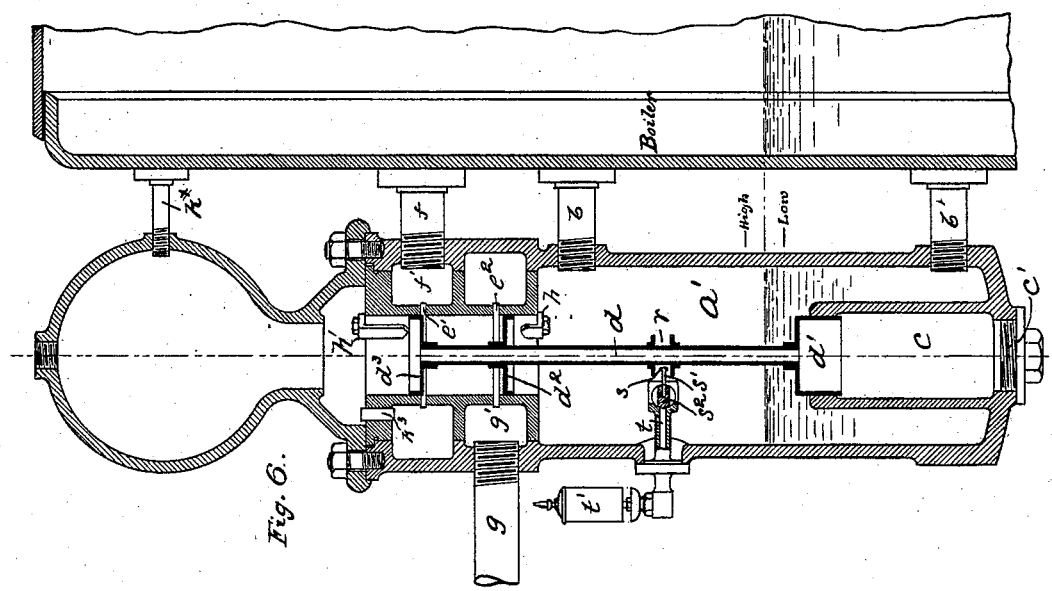
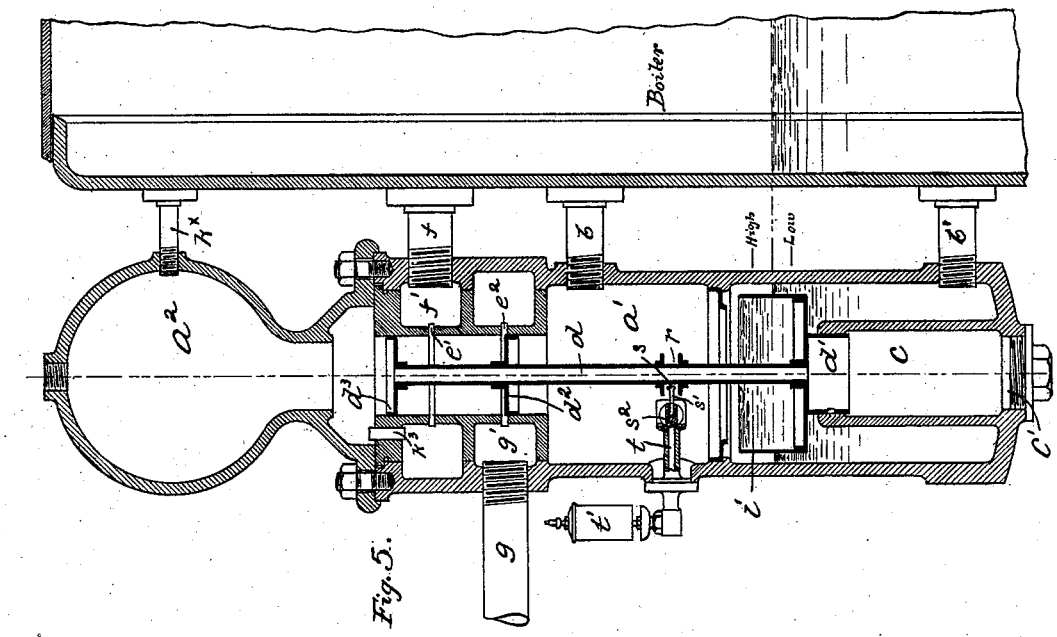
WITNESSES:
INVENTOR
Rudolf Berg
BY Kay & Totten
ATTORNEYS

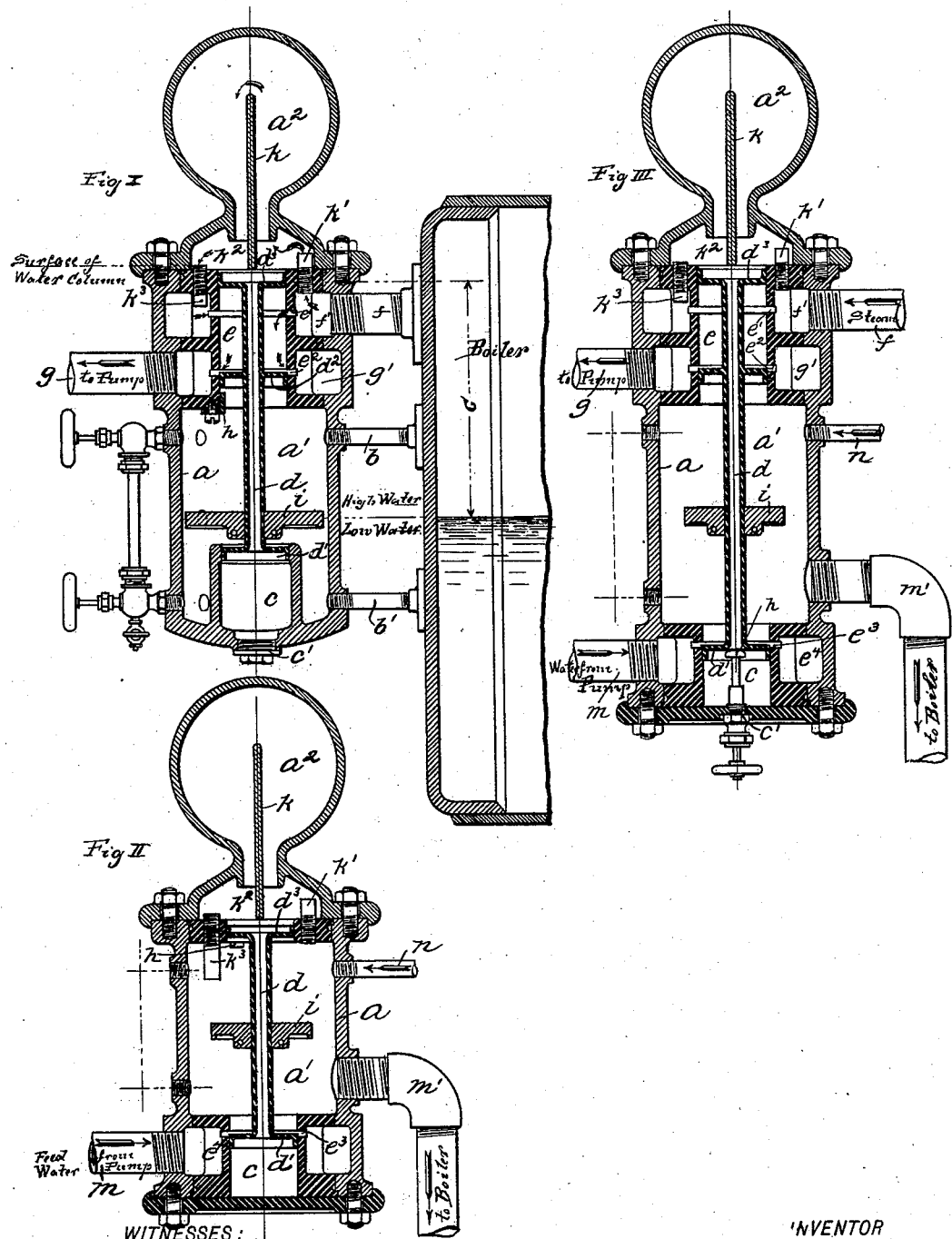

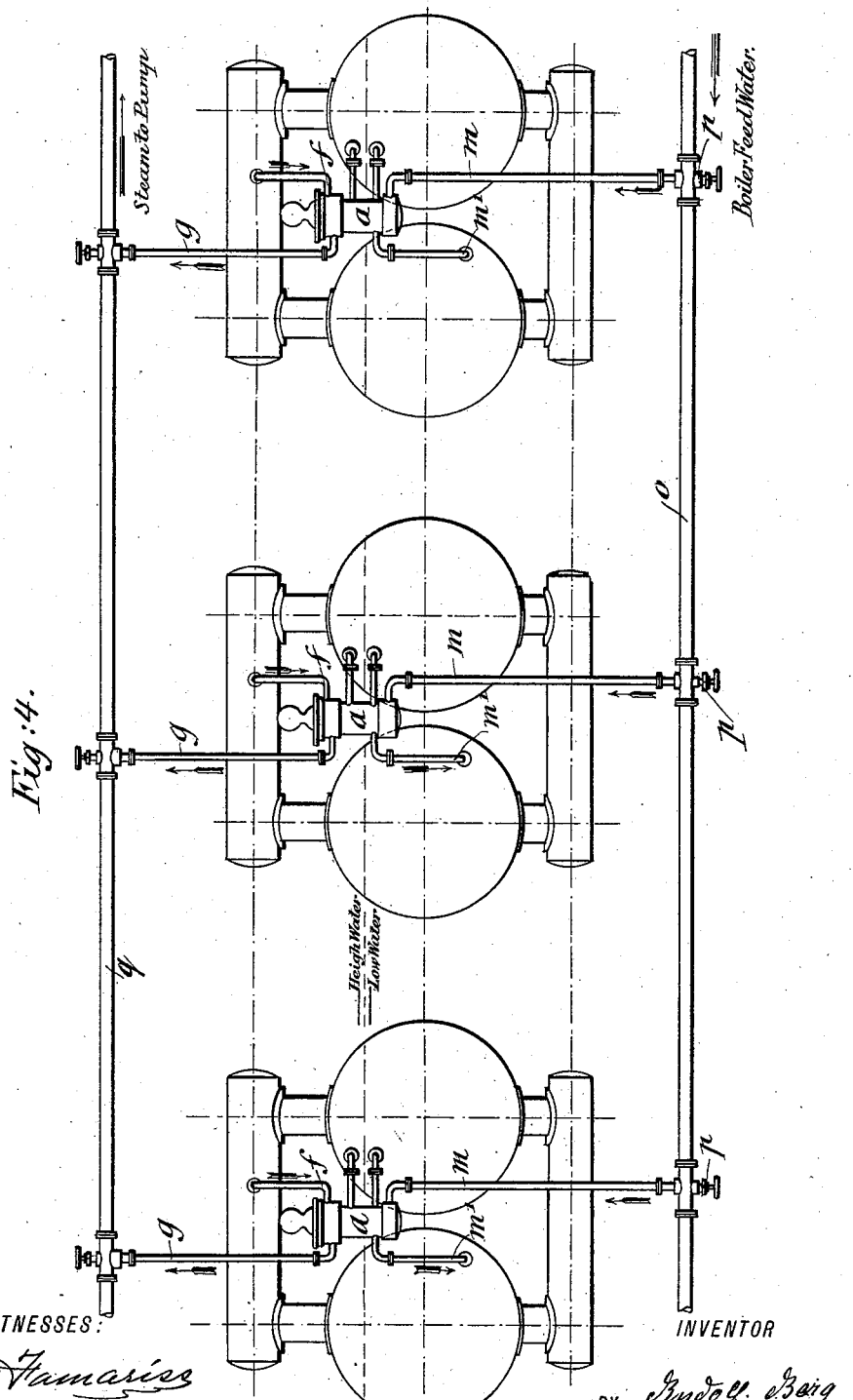

UNITED STATES PATENT OFFICE.

RUDOLF BERG, OF PITTSBURG, PENNSYLVANIA.

FEED-WATER REGULATOR.

SPECIFICATION forming part of Letters Patent No. 589,113, dated August 31, 1897.

Application filed February 17, 1896. Serial No. 579,558. (No model.)

*To all whom it may concern:*

Be it known that I, RUDOLF BERG, a resident of Pittsburg, in the county of Allegheny and State of Pennsylvania, have invented new and useful Improvements in Feed-Water Regulators; and I do hereby declare the following to be a full, clear, and exact description thereof.

My invention relates to an improved feed-water regulator for controlling automatically the supply of water to steam-boilers.

The object of my invention is to construct a feed-water regulator which is free from weights and levers ordinarily employed in connection with such regulators and by which the action of the feed-water pump is retarded or accelerated according to the water-level in the boiler, so that a uniform water-level is obtained.

The invention consists of a feed-water regulator for steam-boilers which comprises an exterior hollow casing provided with interior chambers, pistons in said chambers, a hollow piston-rod connecting said pistons, ports in one or both chambers, and a float on said piston-rod which is actuated by the rising and falling level of the water in the boiler, so as to actuate the pistons and produce the opening or closing of the ports in the chambers and thereby the starting or stopping of the feed-water pump.

In the accompanying drawings, Figure 1 represents a vertical central section of my improved feed-water regulator, showing the same connected with the boiler and arranged for regulating the amount of steam passing to the feed-pump. Fig. 2 is a like section showing the regulator arranged for regulating directly the supply of feed-water from the pump to the boiler. Fig. 3 is also a vertical central section showing the regulator arranged for regulating the steam passing to the feed-pump and also for regulating the supply of water from said pump to the boiler. Fig. 4 is an elevation of a battery of boilers with my improved feed-water regulators applied thereto. Fig. 5 is a vertical central section of a modified form of my invention, and Fig. 6 is a like section of a modified form of my feed-water regulator to be used in connection with a feed-water injector.

Similar letters of reference indicate corresponding parts.

Referring to the drawings, $a$ designates a shell or casing within which the several parts of my improved feed-water regulator are arranged and which is connected, respectively, with the steam and water space of the boiler. In the casing $a$ is arranged a float-chamber $a'$, which is connected by a pipe $b$ with the steam-space of the boiler and by a pipe $b'$ at the lower part of the float-chamber with the water-space of the boiler. By this connection of the casing $a$ with the boiler the height of water as well as the pressure in the float-chamber is always the same as in the boiler.

At the lower part of the casing $a$ is arranged a cylindrical chamber $c$, which may be drained, if desired, by removing a plug $c'$, arranged at the bottom of the chamber $c$. In the upper part of the casing $a$ is arranged a second cylindrical chamber $e$, which is provided with annular ports $e'\ e^2$.

Within the lower chamber $c$ is located a piston $d'$, which is applied to the lower end of a tubular piston-rod $d$, to the upper part of which are applied two pistons $d^2\ d^3$, that are fitted into the upper cylindrical chamber $e$. The interior of the lower and upper chambers $c$ and $e$, as well as the contact-surfaces of the piston $d'\ d^2\ d^3$, are ground and polished, so that the friction between said surfaces is reduced to a minimum. The hollow piston-rod $d$ communicates with the chamber $c$ at the lower end and with a chamber $k^2$, that is arranged above the upper chamber $e$. The upper part of the casing is provided with two annular passages $f'$ and $g'$, of which the upper passage $f'$ is connected by a pipe $f$ with the steam-space of the boiler, while the lower passage $g'$ is connected by a pipe $g$ with the feed-pump. The lower port $e^2$ of the chamber $e$ communicates with the passage $g'$, while the upper port $e^3$ communicates with the passage $f'$. A suitable stop $h$ is applied to the lower end of the upper chamber $e$ and arrests the downward motion of the pistons, while a similar stop is arranged at the upper end of the chamber $e$ for arresting the upward motion of the pistons.

In Figs. 1 to 4 the stop is formed by a partition-plate $k$, which is arranged in a condensing-chamber $a^2$, that is arranged at the upper end of the casing $a$, while in Fig. 7 a second stop $h'$, attached to the upper end of the chamber $e$, is provided. These stops regulate the distance through which the pistons and tubular piston-rod can move and which corresponds to the distance between the high and low water levels in the boiler. To the tubular piston-rod $d$ is attached a float $i$, which is constructed of any suitable material, preferably aluminium. The condensing-chamber $a^2$, arranged at the upper part of the casing $a$, is preferably of spherical shape and divided by the partition $k$ into two compartments, which communicate at the upper end thereof. This spherical chamber $a^2$ communicates with the steam-passage $f'$ by means of a pipe $k'$. As the steam from the boiler enters into the passage $f'$ a portion of it will be conducted through the pipe $k'$ into the condensing-chamber $a^2$, the partition $k$ compelling the steam to ascend in the chamber $a^2$ at one side thereof and to pass over the partition to the other side of the same into the chamber $k^2$, from which the steam is conducted back into the annular passage $f'$ by the pipe $k^3$. As the condensing-chamber $a^2$ is exposed to the atmosphere the steam is condensed therein, so that the water of condensation drips into the chamber $k^2$, so as to gradually fill the lower chamber $c$, hollow piston-rod $d$, and the lower part of the chamber $k^2$ up to a level with the upper edge of the pipe $k^3$.

The partition $k$ can be dispensed with, in which case, as before described, a second stop $h'$ is arranged for the piston-rod $d$, and the condensing-chamber $a^2$, connected directly with the steam-space of the boiler, is made by a pipe $k^\times$, as shown in Figs. 6 and 7.

The condensed water that is collected in the chamber $c$, hollow piston-rod $d$, and chamber $k^2$ forms a water column that balances the float, pistons, and piston-rod, so as to render the same very sensitive to any change of position under the influence of the float $i$.

The operation of the feed-water regulator shown in Fig. 1 and described so far is as follows: The water in the float-chamber $a'$ is always at the same level as the water in the boiler. When the water is at its normal level in the boiler, the water column in the chamber $c$ and piston-rod $d$ will balance the float, so that it will maintain its proper position within the float-chamber. In this position of the float the piston $d^2$ partly closes the steam-port $e^2$, so that sufficient steam is permitted to pass to the feed-pump to keep the same working at a sufficient speed for supplying the water required for the steam-boiler. As before stated, a portion of the steam passes through the condensing-chamber $a^2$, where it is condensed for maintaining the balancing water column at its proper level. When the level of the water in the boiler rises above the normal water-level, the float $i$ will rise to the same extent and carry thereby the hollow piston-rod $d$ and the pistons $d'$ $d^2$ $d^3$ along with it. As the pistons ascend within the chambers $c$ and $e$ the water column within the piston-rod $d'$, piston $d^3$, and space $k^2$ will immediately descend into the chamber $c$, so as to fill up the space formed by the upward movement of the piston $d'$ in the chamber $c$. The upward motion of the piston $d^2$ will close the steam-port $e^2$, so as to shut off the supply of steam to the pump and produce thereby a diminution of the speed of the pump and the stopping of the same. The parts will remain in this position until the water-level of the boiler is gradually lowered to its normal level, whereupon the piston $d^2$ will open the port $e^2$ sufficient to maintain the proper water-level in the boiler. When the water-level in the boiler falls below the normal level, the piston-rod $d$, with the pistons $d'$ $d^2$ $d^3$, will follow the falling motion of the float $i$, so that the water column will be forced from the lower chamber $c$ into the upper chamber $k^2$, while the pistons $d'$ and $d^2$ will descend and open the ports $e^2$ entirely, so that a full head of steam is permitted to pass to the pump, whereby the speed of the same is accelerated and a greater quantity of water is pumped into the boiler until the normal water-level is restored. By the ascending or descending motion of the piston $d'$ the water column in the chamber $c$ and hollow piston-rod $d$ will flow into the chamber $c$ or into the chamber $k^2$, so as to produce thereby a motion of the pistons corresponding to the motion of the float $i$. Any water that may escape between the pistons and their cylinders is immediately replaced by a fresh supply of condensed water, so that the height and quantity of water in the water column remains constant. The pistons in the upper cylinder are always kept clean, as the condensed water contains no impurities, while any impurities that may pass along piston $d'$ into the chamber $c$ will be collected at the bottom of the chamber $c$, and can be removed from time to time by opening the screw-plug $c'$.

The feed-water regulator shown in Fig. 2 is so constructed that the feed-water is supplied directly to the boiler, the steam in this case being conducted directly from the boiler to the pump. The lower chamber $c$ is in this case provided with a port $e^3$, by which communication between the passage $e^4$ and the float-chamber $a'$ is made. A pipe $m$ connects the feed-pump with the passage $e^4$, while a pipe $m'$ connects the float-chamber with the steam-boiler. A small pipe $n$ admits steam from the boiler to the float-chamber $a'$ and to the condensing-chamber $a^2$. Any change of water-level in the boiler will create a corresponding change of the float $i$, so as to cause the rising or lowering of the same, as the case may be. When the float $i$ is raised by the rise of the water-level in the boiler, the piston $d'$ will follow its motion and close the port $e^3$, so that the supply of water is gradually shut off. When the float descends, the piston $d'$ will gradually open the port $e^3$, and thereby supply the feed-water, so that by the play of the piston $d'$ the proper water-level in the boiler is maintained.

The feed-water regulator shown in Fig. 3 is adapted to regulate at the same time both the steam-supply to the feed-pump as well as the supply of feed-water to the boiler. This form combines the constructions shown in Figs. 1 and 2, and a movement of the float $i$ controls thereby the steam-port $e^2$ as well as the feed-water port $e^3$. This construction of the feed-water regulator is especially applicable for use in connection with a battery of boilers, such as shown in Fig. 5. In this case the regulators are connected with a main feed-water pipe $o$ by pipes $m$, that are provided at their connection with the pipe $o$ with stop-cocks $p$. The main steam-pipe $q$, which leads to the pump, is connected with the regulators by steam-pipes $g$, which can likewise be shut off by stop-cocks. As in a battery of boilers it is practically impossible to maintain a uniform temperature beneath the the same, so that all of the boilers of the said battery will be equally heated, accordingly the ebullition in one boiler will be greater than in another. This increased ebullition causes the water to rise higher in said boiler, so that consequently the water in the float-chamber will rise to a corresponding height, thus raising the pistons, so that the supply of steam to the pump as well as the supply of water from the pump to the boiler is interrupted. In this manner each boiler is controlled independently of the others, and thereby the variation in the temperatures of said boilers provided for.

In the feed-water regulator shown in Figs. 5 and 6 the partition $k$ in the condensing-chamber $a^2$ is omitted, also the pipe $k'$, and the chamber $a^2$ connected directly with the boiler by the pipe $k^\times$. In Fig. 5 the stops $h\ h'$ are arranged in the float-chamber $a'$, instead of at the upper cylinder. In place of a solid float, the float can be made in the form of a cup, which is filled with a suitable liquid and by which a greater degree of sensitiveness is obtained than when a solid float is employed. In Fig. 6 a feed-water regulator is shown which is applicable for use with injectors. In this case the float is dispensed with, the pistons being operated by the difference of pressure of the higher or lower column of water above the lower piston $d'$, so that by the rising or lowering of the piston $d^2$ the steam is supplied intermittently from the boiler through the steam-passage $g'$ and steam-pipe $g$ to the injector, either at a full head or shut off entirely, so as to produce thereby the proper working of the injector.

My invention is applicable to all forms of feed-water pumps, whether they are operated continuously or intermittently, as in the case of injectors.

I do not desire to limit myself to the particular constructions shown and described, as they may be changed or modified according to requirements.

Having thus described my invention, I claim as new and desire to secure by Letters Patent—

1. The combination, with a casing and chambers arranged within the same, of pistons in said chambers, a tubular piston-rod connecting said pistons, ports in the upper chamber, and pipes connecting the casing with the steam and water spaces of the boiler, and with the feed-pump, substantially as set forth.

2. The combination, with a casing and chambers arranged within the same, of pistons located in said chambers, a tubular piston-rod connecting said pistons, a float on said piston-rod, ports in the upper chamber, and pipe connections between the casing and the water and steam spaces of the boiler and between the casing and the feed-pump, substantially as set forth.

3. The combination, with a casing and chambers arranged within the same, of pistons located in said chambers, a tubular piston-rod connecting said pistons, a float on said piston-rod, ports in the upper chamber, a condensing-chamber above the upper piston, and pipe connections between the casing and the water and steam spaces of the boiler and between the casing and the feed-pump, substantially as set forth.

4. The combination, with a casing and chambers arranged at the lower and upper parts of the same, of pistons located in said chambers, a hollow piston-rod connecting said pistons, a float on the piston-rod, a condensing-chamber at the upper part of the casing, pipes connecting the casing and condensing-chamber with the water and steam spaces of the boiler, and pipes connecting the casing with the feed-pump, substantially as set forth.

5. The combination, with a casing and of cylinders arranged within said casing, of pistons located in said cylinders, a tubular piston-rod connecting said pistons, a float on the piston-rod, ports arranged in the upper chamber, a condensing-chamber at the upper part of the casing, steam-passages arranged around the upper cylinder, pipes connecting the steam and water spaces of the boiler respectively with the float-chamber and steam-passages, and pipes connecting said steam-passages with the steam-space of the boiler and with the feed-pump, substantially as set forth.

6. The combination, with a casing and cylinders arranged within the same, of pistons located in said cylinders, a hollow piston-rod connecting said pistons, a float on said piston-rod, a port located in the lower cylinder, a passage arranged around the lower cylinder, pipes connecting the casing with the steam and water spaces of the boiler, and a pipe connecting the passage around the lower cylinder with the feed-pump, substantially as set forth.

7. The combination, with a casing and chambers arranged at the lower and upper parts thereof, each chamber being provided with ports, passages extending around said cylinders, pistons located in said cylinders, a tubular piston-rod connecting said pistons, a float on said piston-rod, pipes connecting the casing with the steam and water spaces of the boiler, and pipes connecting the passages around the upper and lower cylinders with the boiler and feed-pump, substantially as set forth.

8. The combination, with a casing and cylinders having ports located within the same, of pistons located in said cylinders, a hollow piston-rod connecting said pistons, a float on said piston-rod, a condensing-chamber, at the upper part of the casing, stops for limiting the up-and-down motion of the pistons, pipes connecting the casing with the steam and water spaces of the boiler, a pipe connecting the condensing-chamber with the boiler, and pipes for connecting the cylinders with the boiler and the feed-pump, substantially as set forth.

In testimony whereof I, the said RUDOLF BERG, have hereunto set my hand.

RUDOLF BERG.

Witnesses:
ROBERT C. TOTTEN,
WALTER FAMARISS.